United States Patent
Lee et al.

(10) Patent No.: US 8,083,460 B2
(45) Date of Patent: Dec. 27, 2011

(54) CABLE-DRIVEN MANIPULATOR

(75) Inventors: Jong Kwang Lee, Daejeon (KR); Chang Hwan Choi, Daejeon (KR); Kwang Ho Yoon, Seoul (KR); Hyo Jik Lee, Daejeon (KR); Byung Suk Park, Daejeon (KR); Ji Sup Yoon, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 397 days.

(21) Appl. No.: 12/328,792

(22) Filed: Dec. 5, 2008

(65) Prior Publication Data

US 2009/0148263 A1    Jun. 11, 2009

(30) Foreign Application Priority Data

Dec. 5, 2007 (KR) .......... 10-2007-0125586
Nov. 13, 2008 (KR) .......... 10-2008-0112545

(51) Int. Cl.
*B25J 13/00* (2006.01)

(52) U.S. Cl. .......... 414/729; 901/21; 74/490.04; 474/32

(58) Field of Classification Search .......... 414/719, 414/744.5, 7; 901/21; 74/490.04, 501.5, 74/501.5 R, 501.6, 505, 506; 474/32, 101, 474/113, 148

See application file for complete search history.

(56) References Cited

U.S. PATENT DOCUMENTS

| | | | | |
|---|---|---|---|---|
| 4,259,876 A | * | 4/1981 | Belyanin et al. ............ | 74/469 |
| 4,883,400 A | * | 11/1989 | Kuban et al. ............... | 414/2 |
| 7,469,617 B2 | * | 12/2008 | Basile et al. ............... | 74/501.5 R |

* cited by examiner

*Primary Examiner* — Donald Underwood
(74) *Attorney, Agent, or Firm* — Bardmesser Law Group

(57) ABSTRACT

The present invention discloses a cable-driven manipulator comprising an operating unit having a drive motor, and a pulley rotated by the drive motor. An upper arm is coupled, through a joint, to one side of the operating unit. A forearm coupled, through a joint, to the other side of the upper arm by the cable. A gripper of an end effector operably coupled to the forearm, a cable compensation device is installed between the upper arm and the forearm so as to maintain constant the length of the cable that transmits the power of the operating unit to the end effector during the pivoting of the forearm. It is thus possible to prevent the variation of tensile force due to the variation of the length of the cable for operating the end effector during the pivoting of the forearm or the unintended malfunction of the end effector.

11 Claims, 10 Drawing Sheets

CABLE-DRIVEN MANIPULATOR

BACKGROUND OF THE INVENTION

This application claims priority to Korean Patent Application No. 10-2007-0125586, filed on Dec. 5, 2007, and Korean Patent Application No. 10-2008-0112545, filed on Nov. 13, 2008, the entire contents of which are hereby incorporated by reference.

FIELD OF THE INVENTION

The present invention relates to a cable-driven manipulator, more specifically to a cable-driven manipulator, in which a cable compensation device is installed between an upper arm and a forearm and is configured so that a length of a cable wound on the pulley provided in the operating unit to operate an end effector is maintained constant even during the pivoting of the forearm. This makes it possible to prevent a variation of tensile force due to a variation of the length of the cable for operating the end effector during the pivoting of the forearm and also prevents an unintended malfunction of the end effector.

DESCRIPTION OF THE RELATED ART

In general, master-slave manipulators are widely used as replacements for human workers in hazardous environments. The dimensions (length, thickness, size, etc.) of the manipulator are designed according to work type and workspace dimensions. Transmission systems driven by cables and pulleys are generally used as power transmission system of manipulators, robots, and other mechanical/mechatronic equipment.

In the power transmitting mechanism driven by cable and pulley, usually a wire is wound on the pulley and power is transmitted by frictional force if the action range of multi-rotation is needed. It is therefore necessary to increase frictional force to increase transmission torque.

The force-reflecting master-slave manipulator used in a radioactive environment transmits power usually by using a tendon like cable such as steel cable or tape. This is because it is possible to greatly increase back-drivability and accordingly, greatly improve the force-reflecting characteristics, by greatly reducing the backlash and friction generated during power transmission by gears.

Also, since actuators can be installed far away from joints or links, the weight or inertia of a manipulator arm can be reduced. Therefore, small capacity actuators can be used and accordingly the dynamic performance of the system can be improved.

FIG. 1 is a cross sectional view showing a conventional cable-driven manipulator, FIG. 2A is a cross-sectional view showing a gripper of an end effector in a conventional cable-driven manipulator, and FIG. 2B is a schematic view showing a handle of an end effector in a conventional cable-driven manipulator. FIGS. 3A and 3B are schematic views showing the states of the cable wound on the upper arm and the forearm, when the forearm of the conventional cable-driven manipulator is at a neutral position and when it is pivoting, respectively.

As shown in FIG. 1, a conventional cable-driven manipulator comprises on operating unit 1 having a drive motor (actuator) 1$a$, bevel gears and a pulley 1$b$ that interlock with the drive motor 1$a$; an upper arm 2, one end of which is coupled, through a joint, to the operating unit 1 and is pivoted by power transmitted from the operating unit 1 through a cable 5; a forearm 3, one end of which is coupled, through a joint, to the other end of the upper arm 2 and is pivoted by the cable 5; and a gripper (or more generally, an end effector) 4 coupled, through a joint, to the other end of the forearm 3 and which is operated by the cable 5.

The cable 5 is guided over several pulleys, and is coupled to the pivoted joint. The cable 5 transmits the power of the drive motor 1$a$ to the gripper 4. The gripper 4 effects movements of roll, pitch, yaw, grip, etc. by the cable 5 that passes through the inside of the upper arm 2 and the forearm 3. For this, as shown in FIG. 2A, when the drive motor 1$a$ is rotated, the chain 4$a$, installed in the gripper 4, is pulled by the cable 5, which is wound on the axis of a bevel gear. Thus, the links 4$b$ are rotated, so that the gripper 4 is forced to close. When the drive motor 1$a$ is rotated in the opposite direction, the cable 5 is unwound, so that the gripper 4 opens due to the elastic return force of springs 4$c$ installed in the gripper 4.

Meanwhile, the gripper 4 is one of end effectors used in the slave of the cable-driven manipulator. As an end effector of the master manipulator that has the same configuration as the slave manipulator, a handle 8 shown in FIG. 2B can be used. The cable 5 is wound on a handle pulley 8$a$ installed at one end 8' of the handle 8, before the cable 5 is fixed at the other end 8" of the handle 8 via a pivot 8$b$. The handle 8 also makes a swing movement centering on the pivot 8$b$ due to the tension of the cable 5, depending on to the forward or reverse rotation of the drive motor 1$a$.

Although the gripper 4 and the handle 8 are different as far as their use is concerned, they are similar in that both are end effectors of the cable-driven manipulator operated by the tension of the cable 5.

The state in which the upper arm 2 and the forearm 3 are coupled, through a joint, is described as follows by referring to FIG. 3A, which illustrates the gripper 4 is used as an end effector, but it should be understood that using the handle 8 as an end effector is similar.

In the elbow joint, where the upper arm 2 and the forearm 3 are coupled, a second pulley 7 is installed, which is an idle pulley supporting a first pulley 6 and the cable 5.

One end B of the cable 5 is operatively connected to the drive motor 1$a$, and the other end A of the cable 5, is driven by the drive motor 1$a$ installed in the operating unit 1, operatively connected to the gripper 4. When the cable 5 is wound around a pulley the position of B moves left and right. Such a change in position of the cable 5 changes the position of the other end A of the cable 5 via the first pulley 6 and the second pulley 7, and thus the opening and closing actions of the gripper 4 are performed.

However, as shown in FIG. 3B, there is an occurrence of an undesirable interference phenomenon, in which event, in the case of pivoting the forearm 3 simply in the up/down direction, the contact angle between the first pulley 6 and cable 5 is changed, and, accordingly, the total length of the cable 5 is changed, so the gripper 4 is opened or closed.

For example, if the forearm 3 is rotated counterclockwise by a predetermined angle $\theta$, the total length of the cable from B to A is increased by a predetermined length (the radius r of the first pulley 6×angle $\theta$) compared with the reference position. Conversely, if the forearm 3 is rotated clockwise, the total length of the cable is decreased by a predetermined length (the radius r of the first pulley 6×angle $\theta$).

The conventional cable-driven manipulator as described above can generate the interference phenomenon, which causes the opening and closing action of the gripper 4 or the swing action of the handle 8 that was not intended during the pivoting of the upper arm 2, due to the geometrical cable-pulley configurations. In particular, such an interference phenomenon can cause the gripped object to fall down when the cable 5 driving the gripper 4 is unwound, or the gripped object can be damaged due to excessive tensile force.

SUMMARY OF THE INVENTION

Therefore, it is an object of the present invention to provide a cable-driven manipulator that can prevent the change of tensile force due to the change of the length of the cable for operating the end effector, or an unintended malfunction of the end effector. It is another object of the invention to make precise position control of the end effector possible, by means of a cable compensation device installed between an upper arm and a forearm of the manipulator, so as to maintain the length of cable constant even during the pivoting of the forearm.

Accordingly, there is provided a cable-driven manipulator including an operating unit having a drive motor, and a pulley which is rotated by the drive motor; an upper arm that is coupled, through a joint, to one side of the operating unit by the power transmitted from the operating unit by a cable; a forearm that is coupled, through a joint, to the other side of the upper arm by the power transmitted from the operating unit by the cable; an end effector that is operably coupled to the forearm by the cables; and a cable compensation device that is installed between the upper arm and the forearm so as to maintain constant the length of the cable that transmits the power of the operating unit to the end effector during the pivoting of the forearm.

The cable compensation device may include a first pulley mounted on a first axis fixed to the upper arm where the upper arm and the forearm are coupled through a joint; a first rotating body integrated with the first pulley so as to interlock with the forearm; a third pulley mounted on a third axis separated at a predetermined interval horizontally lengthwise of the upper arm in the first rotating body; a second rotating body integrated with the third pulley so as to interlock with the first rotating body; and a second pulley mounted on the second axis and is inserted in to a slot formed between the first pulley and the third pulley to enable movement lengthwise of the upper arm, and on which a cable is wound separately from the first pulley and the third pulley respectively. The first, second and third pulleys all have the same radii.

The respective rotation centers of the first, second and third pulleys may be arranged in a straight line. The first rotating body and the second rotating body may be interlocked by links connected pivotably therewith.

The first rotating body of an extended plate shape may have one side coupled to the forearm and the other side pivotably coupled to the first axis, and the second rotating body of the extended plate shape may be pivotably coupled to the third axis to which the third pulley is coupled. These first and second rotating bodies are pivotably connected by a link.

The manipulator may further include a fourth pulley mounted on the first axis on which the first pulley is mounted; a fifth pulley mounted on the second axis on which the second pulley is mounted; and at least one sixth pulley installed on the upper arm so that the cable that is extended from the pulley provided in the operating unit and is wound on the fifth pulley is maintained horizontally lengthwise of the upper arm.

The fifth pulley moves along an imaginary line connecting the rotation center of the fourth pulley and the rotation center of the fifth pulley. The sixth pulley is placed parallel with an imaginary line connecting the rotation center of the fourth pulley and the rotation center of the fifth pulley, and the cable is wound on the fifth pulley by $n\pm\frac{1}{2}$ rotations (where n is a whole number).

Preferably, the radii of the fourth and fifth pulleys and the radii of the first, second and third pulleys are the same.

In one embodiment, the manipulator may further comprise a third rotating body shaped as a plate, which is installed at the other end of the upper arm in separation at a predetermined interval lengthwise from the second rotating body and is coupled to the first rotating body through the link so as to interlock therewith.

In addition, the end effector may be a gripper coupled, through a joint, to the forearm or a handle coupled to the forearm.

The cable-driven manipulator according to the present invention has an advantage in that it is possible to prevent variation of tensile force due to variation of the length of the cable for operating the end effector during the pivoting of the forearm. Precise position control of the end effector is also possible.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

Figure 5A:
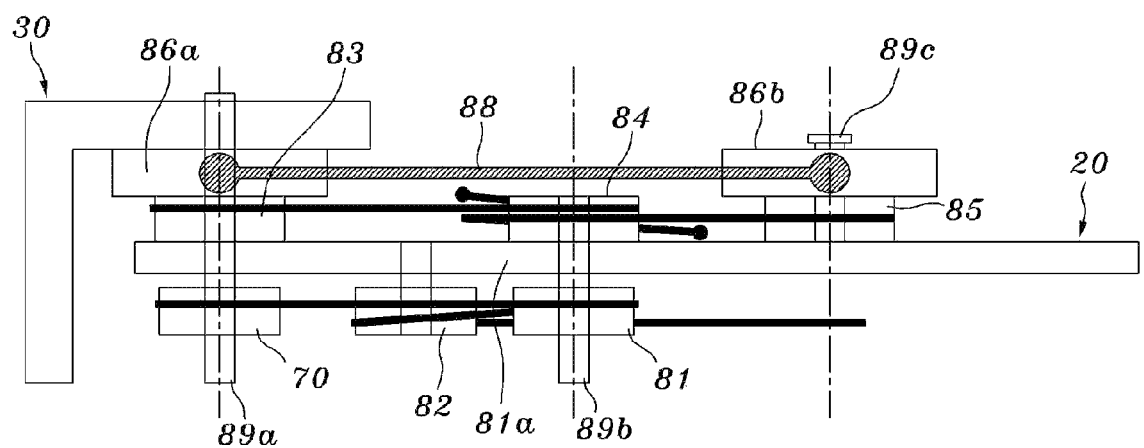
Figure 5B:
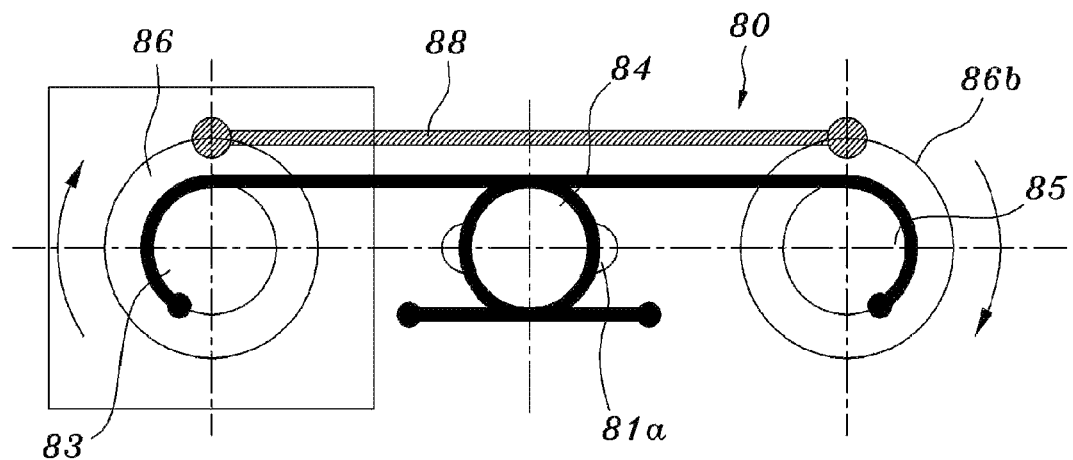
Figure 5C:
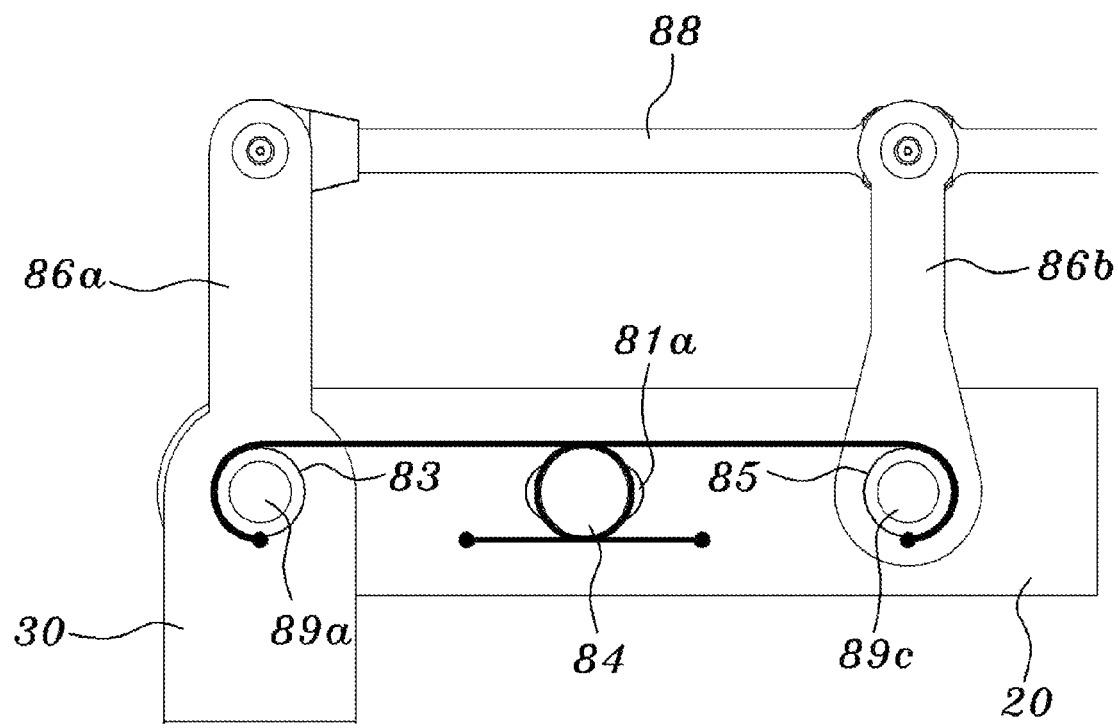

FIG. 5A is a plan view schematically showing the operation of the cable-driven manipulator according to the preferred embodiment of the present invention, and FIGS. 5B and 5C are lateral views schematically showing the operation of the cable-driven manipulator according to the preferred embodiment of the present invention, respectively; and FIGS. 6A to 6D are schematic views showing various arrangements of the fourth to sixth pulleys provided in the cable-driven manipulator according to the preferred embodiment of the present invention.

DETAILED DESCRIPTION OF THE INVENTION

Reference will now be made in detail to the embodiments of the present invention, examples of which are illustrated in the accompanying drawings.

Figure 1:
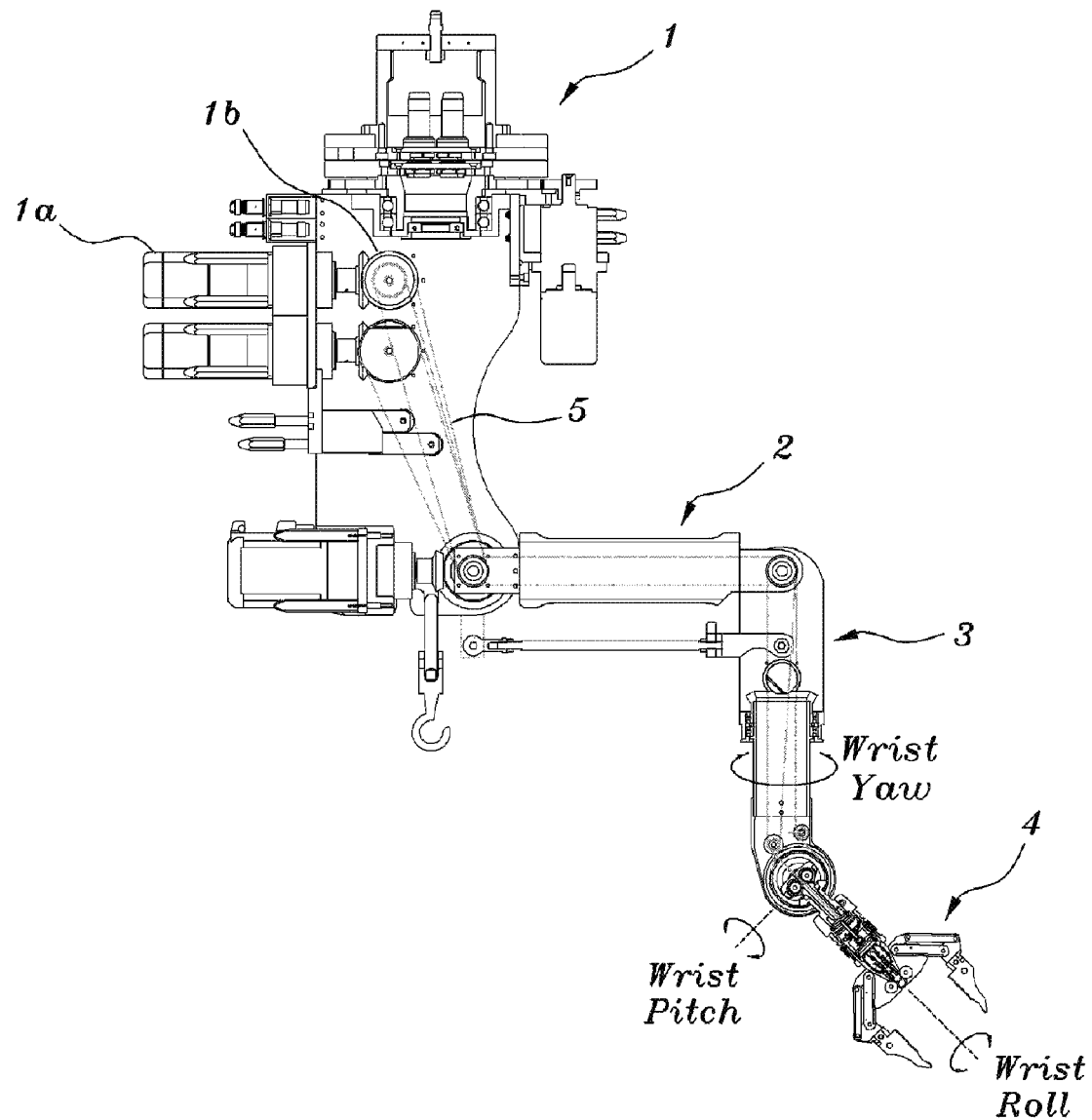
FIG. 1 is a cross-sectional view showing a conventional cable-driven manipulator.
Figure 2A:
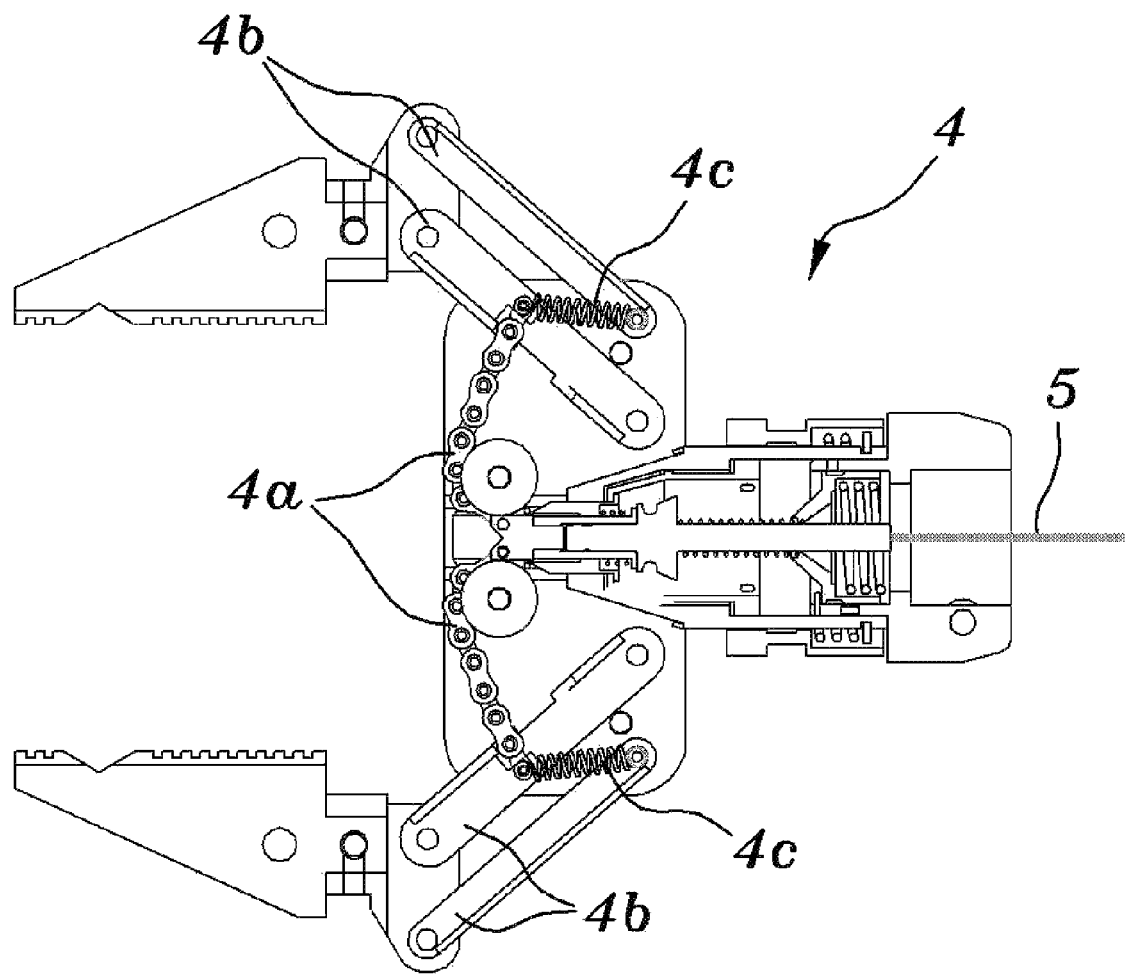
FIG. 2A is a cross-sectional view showing a gripper of a conventional cable-driven manipulator.
Figure 2B:
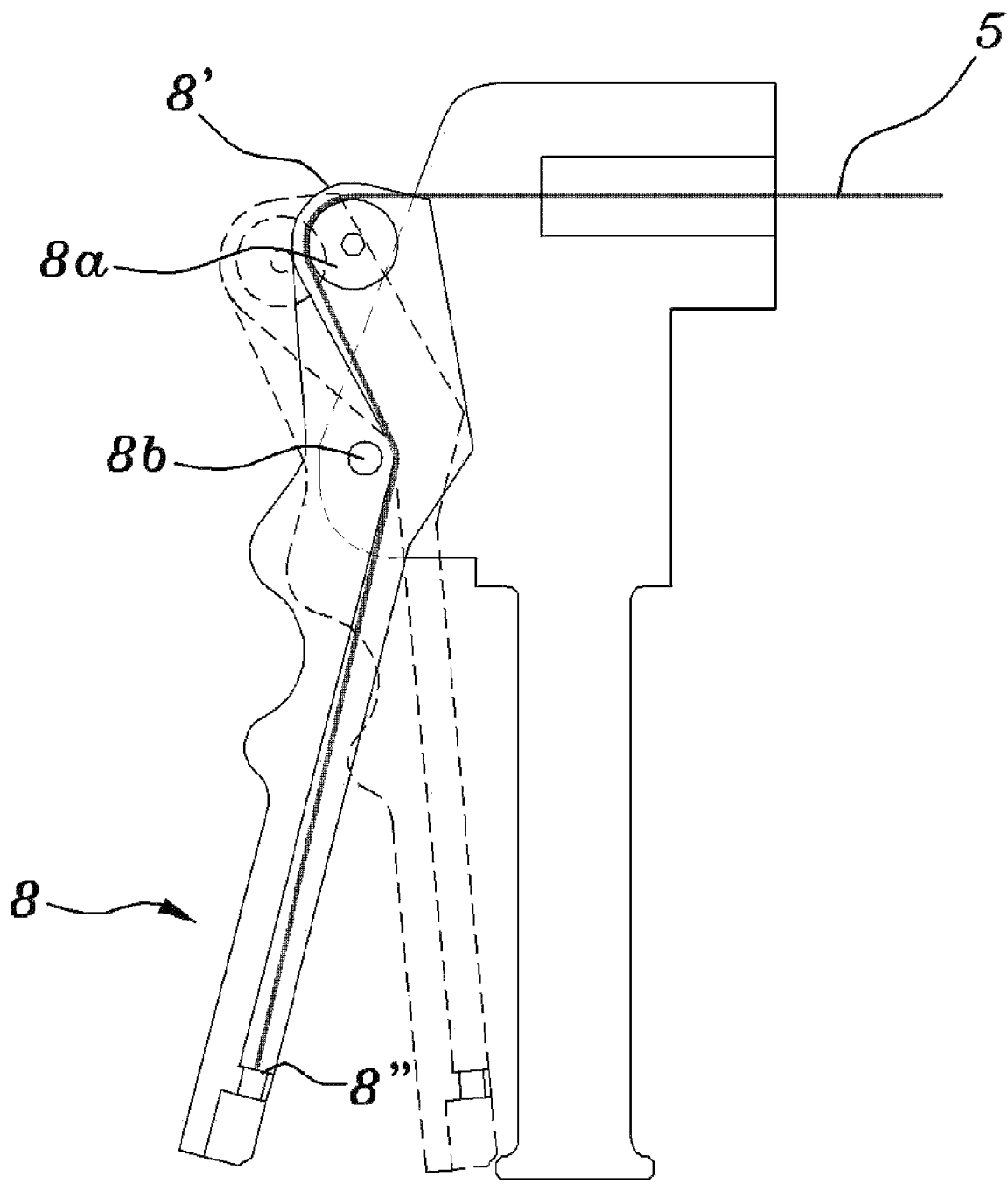
FIG. 2B is a schematic view showing a handle of a end effector in a conventional cable-driven manipulator.
Figure 3A:
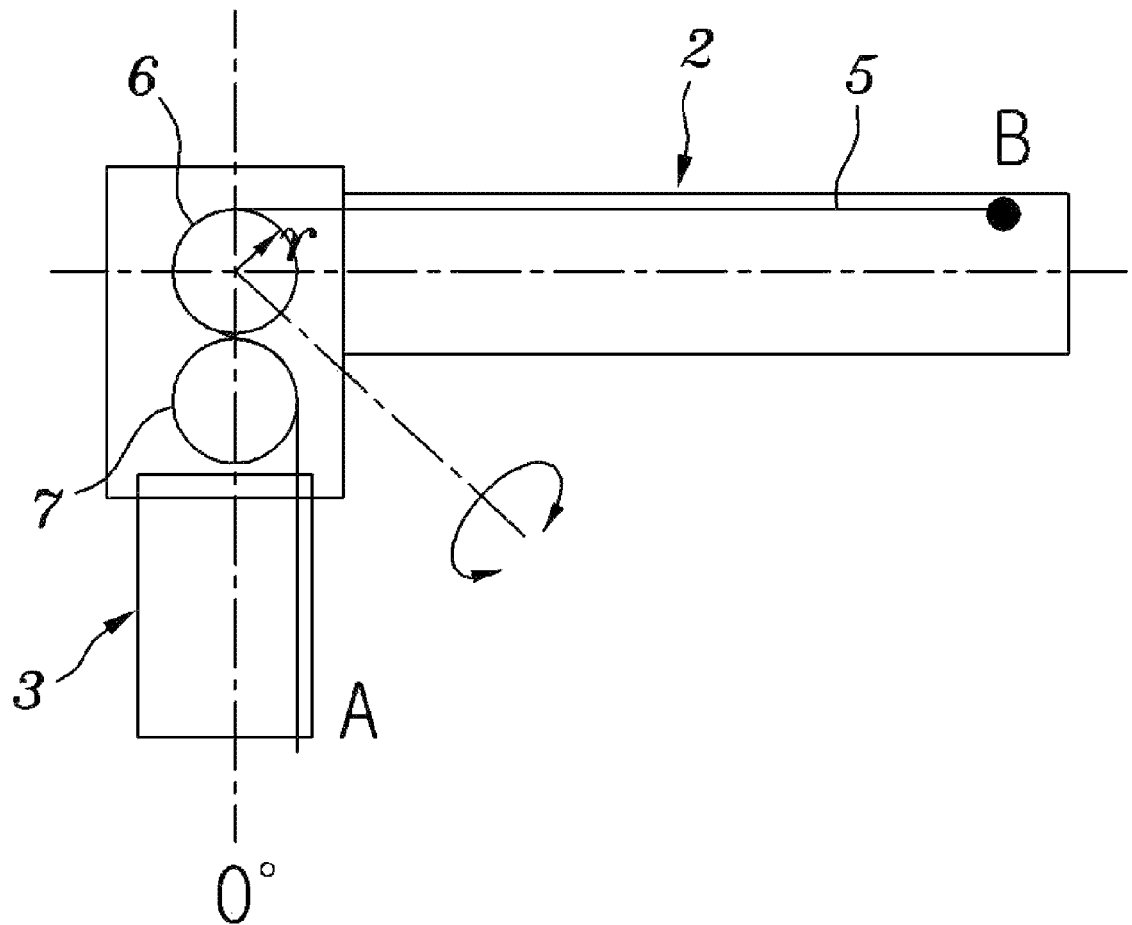
FIGS. 3A and 3B are schematic views showing the states of the cable wound on the upper arm and the forearm, when the forearm of the conventional cable-driven manipulator is at the neutral position and when it is pivoting, respectively.
Figure 3B:
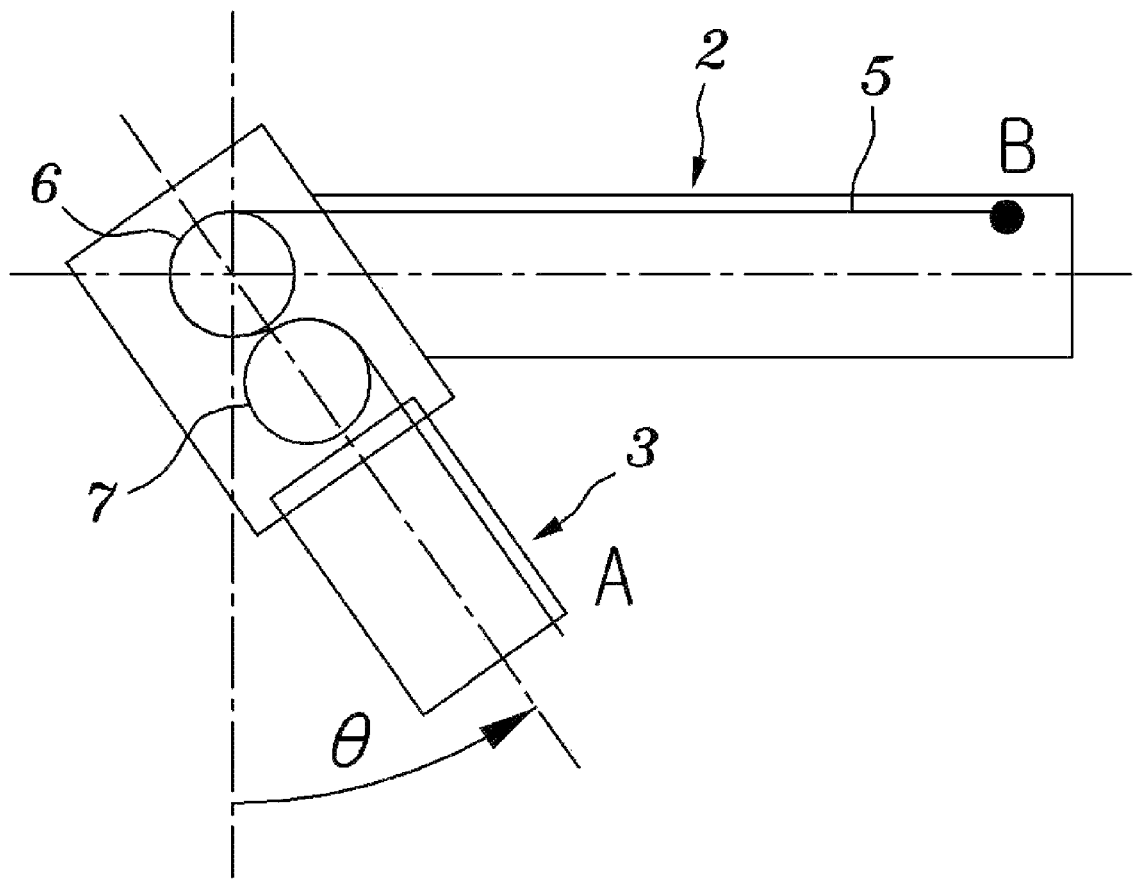
Figure 4A:
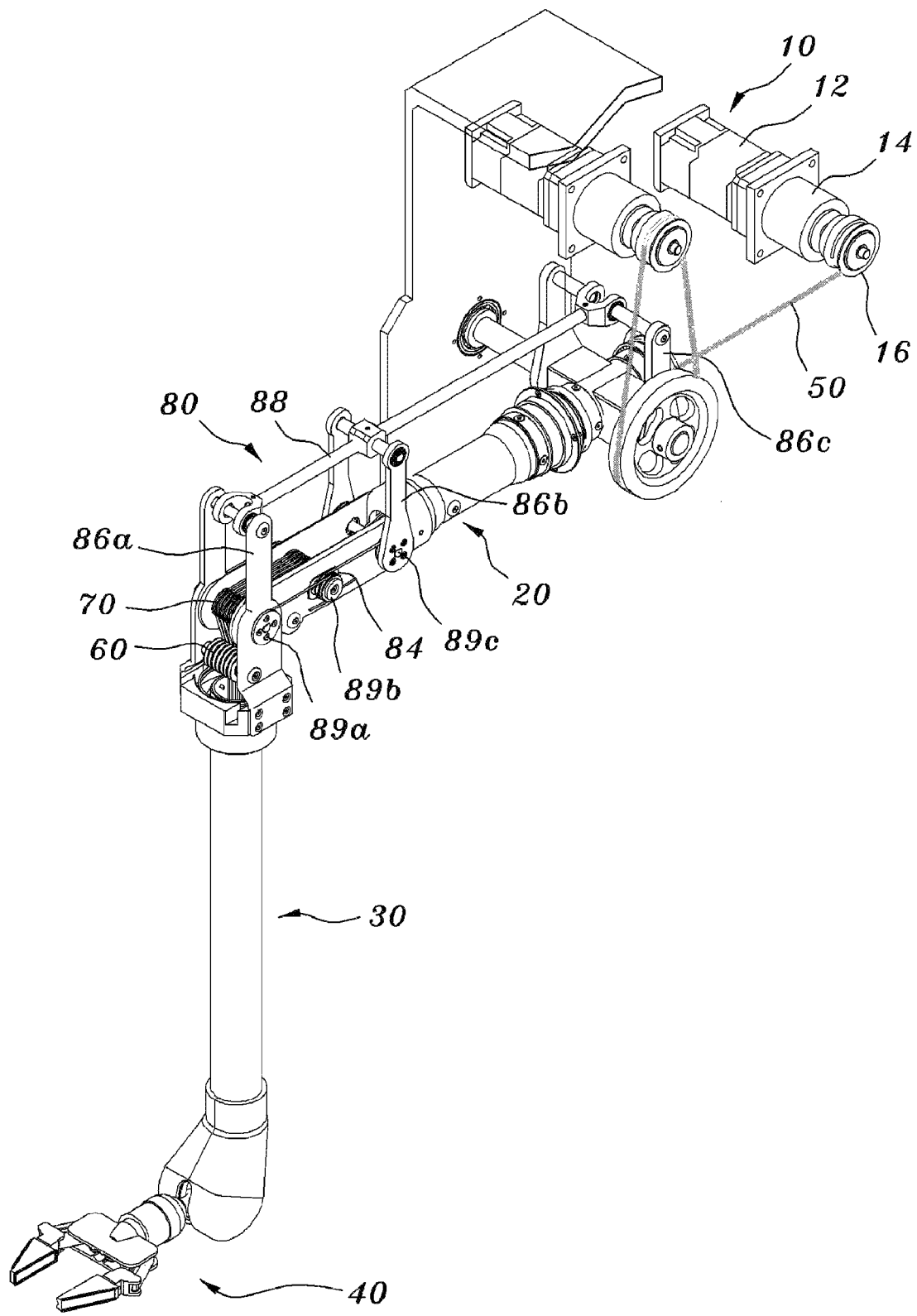
FIGS. 4A and 4B are a perspective view and a plan view showing the cable-driven manipulator according a preferred embodiment of the present invention, respectively.
Figure 4B:
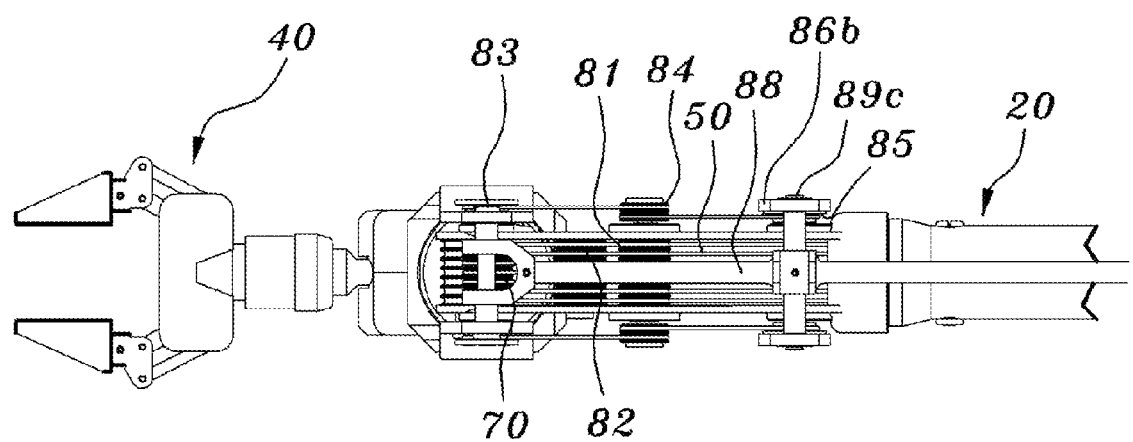

FIGS. 4A and 4B are a perspective view and a plan view showing the cable-driven manipulator according a preferred embodiment of the present invention, respectively. FIG. 5A is a plan view schematically showing the operation of the cable-driven manipulator according to the preferred embodiment of the present invention. FIGS. 5B and 5C are lateral views schematically showing the operation of the cable-driven manipulator according to the preferred embodiment of the present invention, respectively. FIGS. 6A to 6D are schematic views showing various arrangements of the fourth to sixth pulleys provided in the cable-driven manipulator according to the preferred embodiment of the present invention.

As shown in FIGS. 4A to 6A, the cable-driven manipulator according to the preferred embodiment of the present invention comprises an operating unit 10 having a drive motor 12 and a pulley 16 that is rotated by the drive motor 12. An upper arm 20 is coupled through a joint to the one side of the operation unit 10. A forearm 30 is coupled through a joint to the other side of the upper arm 20. An end effector 40 is coupled through a joint to the forearm 30. A cable compensation device 80 is installed between the upper arm 20 and the forearm 30 so as to maintain constant the length of the cable 50 that transmits the power of the operating unit 10 to the end effector 40 during the pivoting of the forearm 30.

If necessary, a speed reducer 14 may be installed between the drive motor 12 and the pulley 16. However, because the present discussion is primarily directed to the cable compensation device 80 that maintains constant the length of the cable 50 that drives the end effector of the manipulator during the pivoting of the forearm, detailed descriptions for the components related to the drive motor and cable for movements of roll, pitch, yaw, etc. of the upper arm and the forearm of the manipulator are omitted.

In the preferred embodiment of the present invention, the gripper is given as an example of the end effector 40, but it is understood that not only the gripper 40 but also the handle 8 described above can be used as an end effector 40.

The cable-driven manipulator configured as described above transmits the power of the operating unit 10 to the gripper 40 (end effector) by the cable 50 that passes through the inside of the upper arm 20 and the forearm 30, to make the movements of roll, pitch, yaw, grip, etc. of the gripper 40 possible. Between the upper arm 20 and the forearm 30 the cable compensation device 80 is provided that maintains constant the length of the cable 50 for the movement of the gripper 40. Therefore, the variation of tensile force due to the variation of the length of the cable 50 that operates the gripper 40 is prevented. Also, unintended malfunction of the gripper 40 is prevented during the pivoting of the forearm 30, and precise position control of the gripper 40 becomes possible.

Here, the cable compensation device 80 includes, as shown in FIG. 5A and FIG. 5B, a first pulley 83 mounted on a first axis 89a fixed to the upper arm 20, where the upper arm 20 and the forearm 30 are coupled using a joint, a first rotating body 86a integrated with the first pulley 83 so as to interlock with the forearm 30, a third pulley 85 separated at a predetermined interval lengthwise of the upper arm 20 from the first rotating body 86a and installed in the upper arm 20, and a second rotating body 86b integrated with the third pulley 85. At this time, the second rotating body 86b and the first rotating body 86a are pivotably connected by a link 88 so as to interlock with each other.

Also, a second axis 89b that is movable left or right lengthwise of the upper arm 20 is inserted into a slot 81a formed between the first pulley 83 and the third pulley 85. A second pulley 84 is mounted on the second axis 89b and is operated by the first pulley 83 and the third pulley 85 and cables wound independently of each other. At this time, the first rotating body 86a is fixed to the forearm 30, and is rotated at the same angle with the rotation of the forearm 30. The first, second and third pulleys 83, 84 and 85 have equal radii, and the rotation centers of the pulleys 83, 84 and 85 can be arranged in a straight line.

Meanwhile, as shown in FIG. 5C, the first rotating body 86a having an extended plate shape has one side, which is coupled to the forearm 30, and the other side, which is coupled to the first axis 89a and formed with an extended plate therefrom. The second rotating body 86b (also with an extended plate shape) can be pivotably coupled to the third axis 89c having the third pulley 85 coupled therewith. At this time, the link 88 is pivotably connected to the first and second rotating bodies 86a and 86b of a plate shape, respectively, to interlock these elements.

In the above embodiment, the first rotating body 86a and the second rotating body 86b were illustrated and described in a configuration in which they are connected by the link 88 so as to be interlocked with each other. Additionally, although not shown in these drawings, a configuration in which the first rotating body 86a and the second rotating body 86b are wound with one cable to be interlocked with each other, is also possible. Also, a configuration in which the first rotating body 86a and the second rotating body 86b are formed with sprockets and a chain is wound on the sprockets of the first rotating body 86a and the second rotating body 86b to be interlocked with each other is also possible.

Figure 6A:
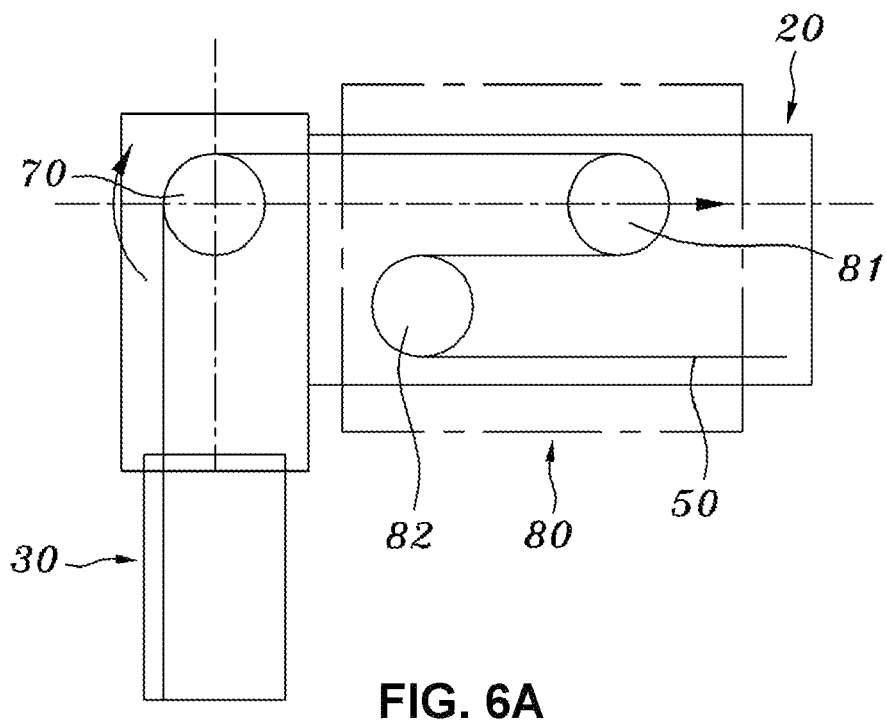

The cable compensation device 80 further comprises, as shown in FIG. 5A and FIG. 6A, a fourth pulley 70 mounted on the first axis 89a (on which the first pulley 83 is mounted), and a fifth pulley 81 mounted so as to be interlocked with the second pulley 84 on the second axis 89b on which the second pulley 84 is mounted. Meanwhile, at least one or more sixth pulleys 82 on the upper arm 20 are mounted. This sixth pulley 82 is an idle pulley, which is arranged in such a way that the cable 50 wound on the fifth pulley 81 is maintained horizontally lengthwise of the upper arm 20.

The cable 50 wound on the pulley 16 provided in the operating unit 10 is wound on the fourth, fifth and sixth pulleys 70, 81 and 82 before it is connected to the gripper 40 to transmit power. At this time the fourth and sixth pulleys 70 and 82 are fixed pulleys, and the fifth pulley 81 mounted on the second axis 89b, is a movable pulley that moves left or right in proportion to the amount of rotation of the forearm 30. The fourth and fifth pulleys 70, 81 have the same radii, and these pulleys 70 and 81 have the same radii with the first, second and third pulleys 83, 84, and 85. Therefore, the first to fifth pulleys 83, 84, 85, 70 and 81 all have the same radii.

In the cable compensation device 80, the second pulley 84 mounted on the second axis 89b is movably installed in the upper arm 20 moves left or right corresponding to the rotation of the forearm 30, and, accordingly, the fifth pulley 81 mounted on the second axis 89b is movably installed in the upper arm 20 and moves left or right, so that the length variation of the cable 50 by the rotation of the forearm 30 is compensated for.

Specifically, because the first rotating body 86a and the second rotating body 86b are connected by the link 88, the first and second rotating bodies 86a and 86b are interlocked with each other. For example, when the forearm 30 rotates clockwise, the first rotating body 86a and the second rotating body 86b rotate also in the same direction through the link 88. At this time, the cable wound between the first pulley 83 and the second pulley 84, which is arranged on the first axis 89a in which the first rotating body 86a is installed, is unwound.

Also, the cable wound between the third pulley 85 and the second pulley 84, which is arranged on the third axis 89c in which the second rotating body 86b is installed, is wound. As a result, the second pulley 84, which is a movable pulley, is moved in the right direction in the drawing. The diameters of the first, second and third pulleys 83, 84 and 85 are the same, so if the first rotating body 86a rotates by a predetermined angle θ, the second pulley 84 moves linearly to the right by a predetermined length (radius r of the first pulley 83×angle θ/2). Likewise, if the forearm 30 rotates counterclockwise, the second pulley 84, which is a movable pulley, moves linearly to the left as much as the predetermined length (radius r of the first pulley 83×predetermined angle θ/2).

If the second pulley 84 moves linearly by a predetermined length, the fifth pulley 81 connected on the same axis (i.e., the second axis 89b) as the second pulley 84 likewise moves linearly. Since the first to fifth pulleys 83, 84, 85, 70 and 81 all have the same radius, the fifth pulley 81 also moves linearly as much as the predetermined length (radius r of the first pulley 83×predetermined angle θ/2). When the fifth pulley 81 moves linearly by the predetermined length (radius r of the first pulley 83×predetermined angle θ/2), the cable 50 that is wound on the fifth pulley 81 and connected to the gripper 40 of the end effector has the length changed as much as the predetermined length (radius r of the first pulley 83×angle θ/2) in two places (where the cable comes in and goes out of the fifth pulley), so the length of the cable 50 at the gripper 40 of the end effector is compensated finally by the predetermined length (radius r of the first pulley 83×angle θ).

If the cable compensation device 80 according to the present invention is introduced, the length of the cable 50 can be maintained constant even if the fourth pulley 70 coupled on the first axis 89a between the upper arm 20 and the forearm 30 rotates, so it is possible to avoid the interference phenomenon due to the operation of the manipulator.

Additionally, it is possible to further add a third rotating body 86c of a plate shape at the other end of the upper arm 20. The third rotating body 86c is installed separately at a predetermined interval lengthwise from the second rotating body 86b. The third rotating body 86c is coupled to the first rotating body 86a through the link 80 so as to interlock therewith (see FIG. 4A). The third rotating body 86c transmits the rotation force of a separately installed driving unit to the forearm 30 through the link mechanism to pivot the forearm 30. At this time, since the third rotating body 86c and the first rotating body 86a are interlocked with each other by the link mechanism, the length variation of the cable by the driving of the third rotating 86c is also compensated by the interlocking of the first rotating body 86a.

Figure 6B:
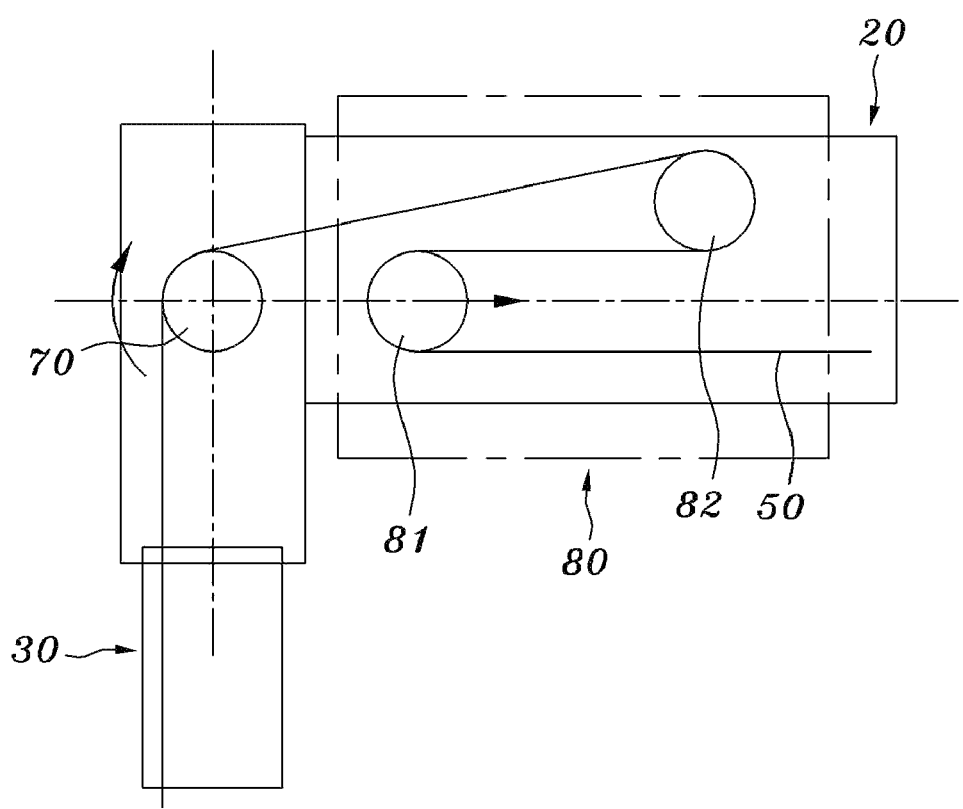
Figure 6C:
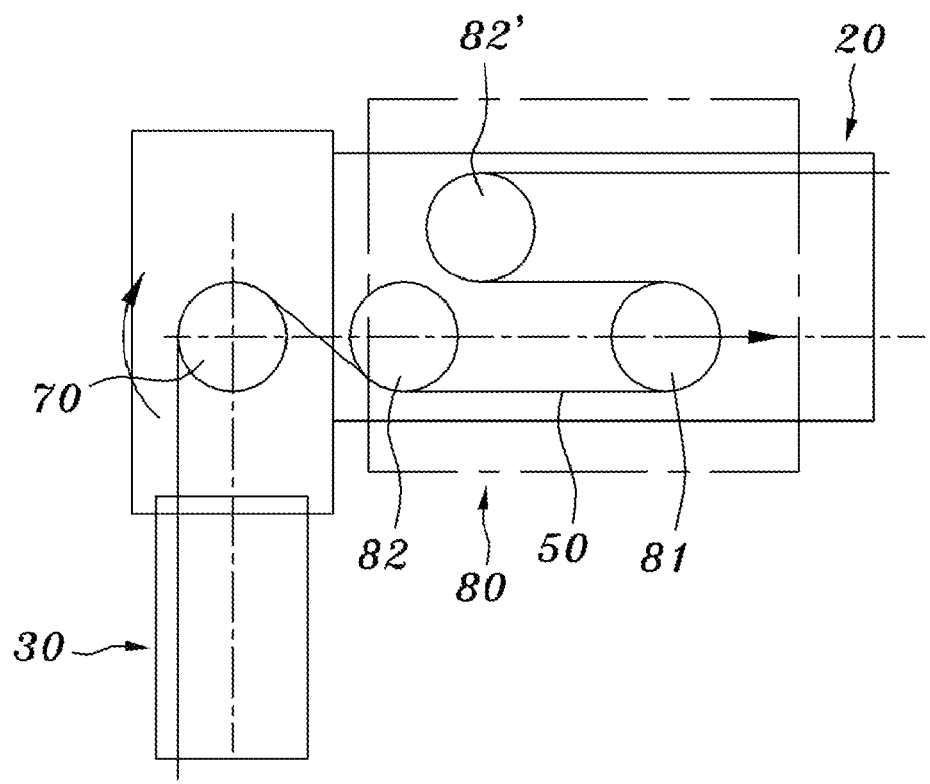
Figure 6D:
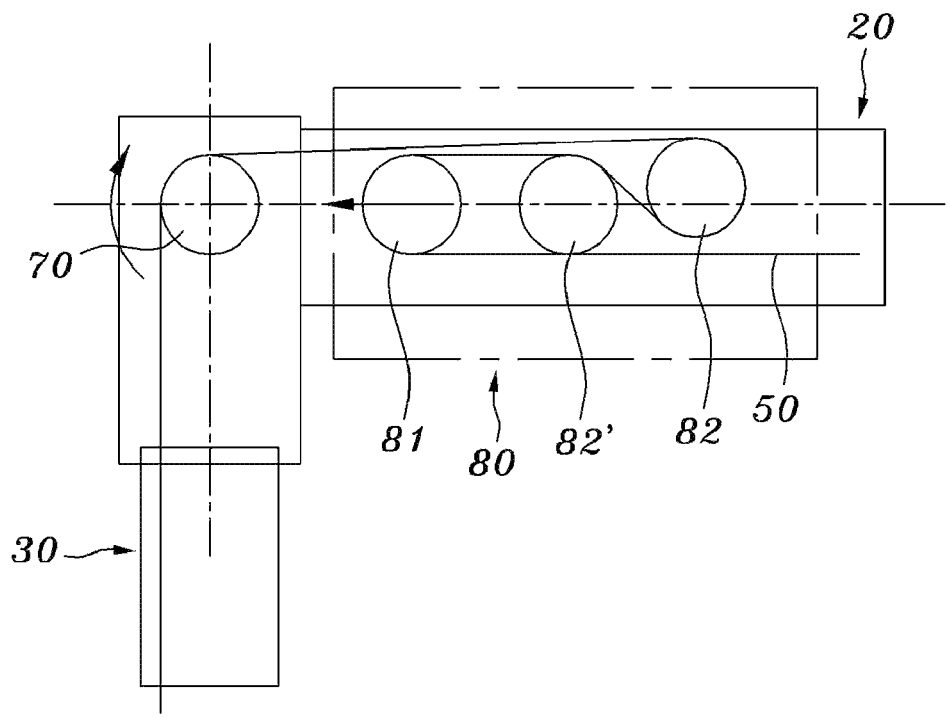

FIGS. 6B to 6D show various examples of applicable arrangements other than the arrangement of the fourth, fifth and sixth pulleys 70, 81 and 82 illustrated in FIG. 6A. Additionally, the fourth, fifth and sixth pulleys 70, 81 and 82 can be analyzed inside the upper arm 20. FIG. 6A and FIG. 6B shows the case of one idle pulley, i.e., the sixth pulley 82, and FIGS. 6C and 6D shows the case of two idle pulleys, the pulleys labeled 82 and 82'. These examples are the arrangements that satisfy two conditions described in detail below, which have the identical effects.

The first condition for the arrangement of the fourth, fifth and sixth pulleys 70, 81 and 82 is that the fifth pulley 81 should move on an imaginary line connecting the rotation centers of the fourth and fifth pulleys 70 and 81.

The second condition is that both ends of the cable 50 wound on the fifth pulley 81 should be in parallel with an imaginary line connecting the rotation centers of the fourth and fifth pulleys 70 and 81. At this time, the cable 50 is wound on the fifth pulley 81 by n±½ rotations (where n is a whole number). That is, the cable 50 should have its direction of motion changed 180° after it is wound on the fifth pulley 81.

If the above two conditions are satisfied, the moved length of the fifth pulley 81 can be reflected on the gripper 40 of the end effector as it is. The number and position of the idle pulleys, the sixth pulleys 82 and 82', and the sequence in which the cable 50 is wound on the fourth, fifth and sixth pulleys 70, 81, and 82 have no effect on the action of the cable-driven manipulator according to the present invention.

In the cable-driven manipulator provided with the cable compensation device 80 having the configuration as described above, the drive motor 12 can be installed away from the portion where the upper arm 20 and the forearm 30 are coupled, so it is possible to reduce the weight or inertia of the upper arm 20 or the forearm 30 of the manipulator. Therefore, it is possible to use the drive motor 12 with a small capacity, and accordingly it is possible to improve the dynamic performance of the cable-driven manipulator and the durability of related parts.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A cable-driven manipulator comprising:
   an operating unit having a drive motor, and a pulley rotated by the drive motor;
   an upper arm coupled, using a first joint at one end of the upper arm, to one side of the operating unit and receiving power transmitted from the operating unit;
   a forearm coupled, using a second joint, to the other end of the upper arm and receiving power transmitted from the operating unit;
   an end effector operably coupled to the forearm;
   a first cable mounted in the operating unit, the first cable transmitting the power of the operating unit to the end effector, the first cable wound between the end effector and the drive motor; and
   a cable compensation device between the upper arm and the forearm that maintains constant a length of the first cable during pivoting of the forearm,
   wherein the cable compensation device comprises:
   a first pulley rotatably mounted on a first axis that is fixed to the upper arm where the upper arm and the forearm are coupled using the second joint;
   a first rotating body integrated with the first pulley so as to interlock with the forearm;
   a third pulley rotatably mounted on a third axis that is separated at a predetermined interval horizontally lengthwise of the upper arm in the first rotating body;
   a second rotating body integrated with the third pulley so as to interlock with the first rotating body; and
   a second pulley fixedly mounted on a second axis that is inserted in a slot formed between the first pulley and the third pulley so that the second pulley can move along the upper arm, and a fourth pulley connected to the second axis on which the first cable is wound separately from the first pulley and the third pulley respectively, and
   wherein the first, second and third pulleys all have the same radii, the first rotating body and the second rotating body are interlocked by a link connected pivotably therewith; and the first rotating body having an extended plate shape with one side coupled to the forearm and the other side pivotably coupled to the first axis, and wherein the second rotating body having an extended plate shape is pivotably coupled to the third axis to which the third pulley is coupled, and wherein the first and second rotating bodies are pivotably connected by the link and the first, second and third pulleys are interconnected by a second cable.

2. The manipulator of claim 1, wherein rotation centers of the first, second and third pulleys are in a substantially straight line.

3. The manipulator of claim 1, further comprising: the fourth pulley mounted on the first axis on which the first pulley is mounted;

a fifth pulley mounted on the second axis on which the second pulley is mounted; and at least one sixth pulley installed on the upper arm so that the first cable that is extended from the pulley provided in the operating unit and is wound on the fifth pulley is maintained horizontally lengthwise of the upper arm.

4. The manipulator of claim 3, wherein the fifth pulley moves along an imaginary line connecting the rotation center of the fourth pulley and the rotation center of the fifth pulley, wherein the sixth pulley is in parallel with an imaginary line connecting the rotation center of the fourth pulley and the rotation center of the fifth pulley, and wherein the first cable is wound on the fifth pulley by $n\pm\frac{1}{2}$ rotations (where n is a whole number).

5. The manipulator according of claim 4, further comprising a third rotating body of a plate shape installed at the one end of the upper arm in separation at a predetermined interval lengthwise from the second rotating body and coupled to the first rotating body through the link so as to interlock therewith.

6. The manipulator of claim 3, wherein the radii of the fourth and fifth pulleys and the radii of the first, second and third pulleys are the same.

7. The manipulator of claim 1, wherein the end effector is a handle coupled to the forearm through a third joint.

8. A cable-driven manipulator comprising:

an operating unit having a drive motor, and a pulley rotated by the drive motor;

an upper arm coupled, using a first joint at one end of the upper arm, to one side of the operating unit and receiving power transmitted from the operating unit;

a forearm coupled, using a second joint, to the other end of the upper arm and receiving power transmitted from the operating unit;

an end effector operably coupled to the forearm;

a first cable mounted in the operating unit, the first cable transmitting the power of the operating unit to the end effector, the first cable wound between the end effector and the drive motor; and a cable compensation device between the upper arm and the forearm that maintains constant a length of the first cable during pivoting of the forearm, wherein the cable compensation device comprises:

a first pulley rotatably mounted on a first axis that is fixed to the upper arm where the upper arm and the forearm are coupled using the second joint;

a first rotating body integrated with the first pulley so as to interlock with the forearm;

a third pulley rotatably mounted on a third axis that is separated at a predetermined interval horizontally lengthwise of the upper arm in the first rotating body;

a second rotating body integrated with the third pulley so as to interlock with the first rotating body; and a second pulley fixedly mounted on a second axis that is inserted in a slot formed between the first pulley and the third pulley so that the second pulley can move along the upper arm, and separately from the first pulley and the third pulley respectively, and wherein the first, second and third pulleys all have the same radii, the first rotating body and the second rotating body are interlocked by a link connected pivotably therewith and the first, second and third pulleys are interconnected by a second cable; and a fourth pulley mounted on the first axis on which the first pulley is mounted;

a fifth pulley mounted on the second axis on which the second pulley is mounted; and a sixth pulley installed on the upper arm so that the first cable that is extended from the pulley provided in the operating unit and is wound on the fifth pulley is maintained horizontally lengthwise of the upper arm, and the first cable being wound on the fourth, fifth and sixth pulleys.

9. The manipulator of claim 8, wherein the first rotating body has an extended plate shape with one side coupled to the forearm and the other side pivotably coupled to the first axis, and wherein the second rotating body having an extended plate shape is pivotably coupled to the third axis to which the third pulley is coupled, and wherein the first and second rotating bodies are pivotably connected by the link.

10. A cable-driven manipulator comprising:

an operating unit having a drive motor, and a pulley rotated by the drive motor;

an upper arm coupled, using a first joint at one end of the upper arm, to one side of the operating unit and receiving power transmitted from the operating unit;

a forearm coupled, using a second joint, to the other end of the upper arm and receiving power transmitted from the operating unit;

an end effector operably coupled to the forearm;

a first cable mounted in the operating unit, the cable transmitting the power of the operating unit to the end effector, the first cable wound between the end effector and the drive motor; and a cable compensation device between the upper arm and the forearm that maintains constant a length of the first cable during pivoting of the forearm, wherein the cable compensation device comprises:

a first pulley rotatably mounted on a first axis that is fixed to the upper arm where the upper arm and the forearm are coupled using the second joint;

a first rotating body integrated with the first pulley so as to interlock with the forearm;

a third pulley rotatably mounted on a third axis that is separated at a predetermined interval horizontally lengthwise of the upper arm in the first rotating body;

a second rotating body integrated with the third pulley so as to interlock with the first rotating body; and a second pulley fixedly mounted on a second axis that is inserted in a slot formed between the first pulley and the third pulley so that the second pulley can move along the upper arm, and separately from the first pulley and the third pulley respectively;

a fourth pulley connected to the second axis on which the first cable is wound;

wherein the first, second and third pulleys are interconnected by a second cable, wherein the first, second and third pulleys all have the same radii, the first rotating body and the second rotating body are interlocked by a link connected pivotably therewith; and wherein rotation centers of the first, second and third pulleys are in a substantially straight line.

11. The manipulator of claim 10, wherein the first rotating body has an extended plate shape with one side coupled to the forearm and the other side pivotably coupled to the first axis, and wherein the second rotating body has an extended plate shape that is pivotably coupled to the third axis to which the third pulley is coupled, and wherein the first and second rotating bodies are pivotably connected by the link.

* * * * *